United States Patent
Koizumi et al.

(10) Patent No.: US 9,282,203 B2
(45) Date of Patent: Mar. 8, 2016

(54) COMMUNICATION APPARATUS, METHOD OF CONTROLLING THE SAME AND STORAGE MEDIUM

(71) Applicant: CANON KABUSHIKI KAISHA, Tokyo (JP)

(72) Inventors: Shigeru Koizumi, Tokyo (JP); Michio Fukushima, Yokohama (JP); Eiji Ohara, Kawasaki (JP); Daisuke Suga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/279,931

(22) Filed: May 16, 2014

(65) Prior Publication Data

US 2014/0368889 A1  Dec. 18, 2014

(30) Foreign Application Priority Data

Jun. 18, 2013 (JP) ................................. 2013-127984

(51) Int. Cl.
*G06F 3/12* (2006.01)
*H04N 1/00* (2006.01)
*H04N 1/32* (2006.01)
*H04N 1/327* (2006.01)

(52) U.S. Cl.
CPC ....... *H04N 1/00214* (2013.01); *H04N 1/32708* (2013.01); *H04N 1/32719* (2013.01)

(58) Field of Classification Search
None
See application file for complete search history.

(56) References Cited

U.S. PATENT DOCUMENTS

| | | | | |
|---|---|---|---|---|
| 5,448,378 A | * | 9/1995 | Matsumoto | H04N 1/32704 358/434 |
| 5,764,376 A | * | 6/1998 | Sato | H04N 1/32704 358/434 |
| 5,870,458 A | * | 2/1999 | Pappas et al. | 379/93.11 |
| 6,335,927 B1 | * | 1/2002 | Elliott et al. | 370/352 |
| 6,463,132 B1 | * | 10/2002 | Yoshida | H04L 5/1446 379/100.01 |
| 6,483,600 B1 | * | 11/2002 | Schuster et al. | 358/1.15 |
| 6,647,099 B1 | * | 11/2003 | Durkin | H04L 12/2854 379/93.02 |
| 7,038,800 B2 | * | 5/2006 | Ono et al. | 358/1.15 |
| 7,463,379 B2 | * | 12/2008 | Shibata | H04N 1/00405 358/1.15 |
| 7,907,708 B2 | * | 3/2011 | Walker et al. | 379/93.09 |
| 8,059,293 B2 | * | 11/2011 | Chen | 358/1.15 |
| 8,949,443 B2 | * | 2/2015 | Izumi | 709/228 |
| 2001/0021040 A1 | * | 9/2001 | Chida et al. | 358/435 |
| 2002/0015415 A1 | * | 2/2002 | Sugino | H04L 1/0003 370/465 |
| 2002/0061012 A1 | * | 5/2002 | Thi et al. | 370/352 |
| 2003/0048483 A1 | * | 3/2003 | Okabe | H04N 1/32704 358/400 |
| 2003/0133144 A1 | * | 7/2003 | Kurtz | 358/1.15 |

(Continued)

FOREIGN PATENT DOCUMENTS

JP   05145695 A   11/1993

*Primary Examiner* — Madelein Nguyen
(74) *Attorney, Agent, or Firm* — Rossi, Kimms & McDowell LLP

(57) ABSTRACT

A communication apparatus comprises a modem configured to performed FAX communication, and a connection unit configured to connect a telephone apparatus. The communication apparatus detects a CNG signal, and controls, in a case where there is an incoming call in a state in which FAX communication is being performed by the modem, if the CNG signal is not detected in the detecting, so that a signal is supplied from a line to the telephone apparatus, and controls, in a case where there is an incoming call in a state in which FAX communication is not being performed by the modem, if the CNG signal is detected in the detecting, so that FAX communication by the modem is initiated.

9 Claims, 4 Drawing Sheets

(56) References Cited

U.S. PATENT DOCUMENTS

| | | | |
|---|---|---|---|
| 2003/0169459 A1* | 9/2003 | Chida | H04N 1/32683 358/400 |
| 2004/0105432 A1* | 6/2004 | Yamaji | 370/352 |
| 2004/0114736 A1* | 6/2004 | Saito | H04M 1/82 379/100.06 |
| 2005/0091407 A1* | 4/2005 | Vaziri et al. | 709/246 |
| 2005/0271197 A1* | 12/2005 | McClure et al. | 379/215.01 |
| 2006/0143307 A1* | 6/2006 | Codignotto | 709/246 |
| 2006/0256395 A1* | 11/2006 | Ito | H04N 1/32016 358/440 |
| 2006/0285171 A1* | 12/2006 | Ma | H04L 29/06027 358/400 |
| 2008/0002222 A1* | 1/2008 | Koide | 358/1.15 |
| 2008/0095145 A1* | 4/2008 | Ulybin | H04L 12/66 370/352 |
| 2008/0285088 A1* | 11/2008 | Tidwell et al. | 358/402 |
| 2010/0091962 A1* | 4/2010 | Hosoi | H04N 1/32704 379/100.01 |
| 2010/0189234 A1* | 7/2010 | Nakazawa | H04M 11/066 379/100.01 |
| 2011/0013544 A1* | 1/2011 | Smith et al. | 370/286 |
| 2011/0109936 A1* | 5/2011 | Coffee et al. | 358/1.15 |
| 2012/0154873 A1* | 6/2012 | Naito | H04M 11/066 358/406 |
| 2013/0163042 A1* | 6/2013 | Sasano et al. | 358/1.15 |
| 2013/0215463 A1* | 8/2013 | Fukushima et al. | 358/1.15 |
| 2014/0168703 A1* | 6/2014 | Nakagawa | 358/1.15 |
| 2015/0003598 A1* | 1/2015 | Ohara et al. | 379/100.01 |

* cited by examiner

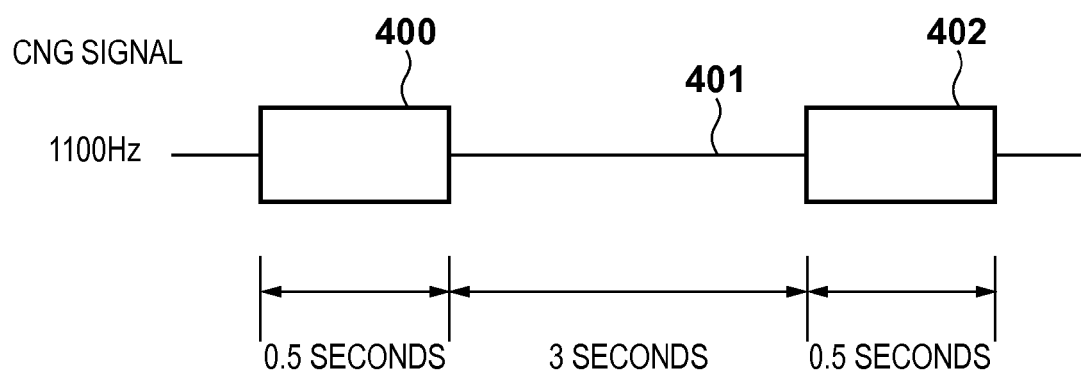
F I G. 4

COMMUNICATION APPARATUS, METHOD OF CONTROLLING THE SAME AND STORAGE MEDIUM

BACKGROUND OF THE INVENTION

1. Field of the Invention

The present invention relates to a communication apparatus, a method of controlling the same, and a storage medium.

2. Description of the Related Art

In recent years, next generation networks (NGN: next generation network) that perform voice communication by IP (Internet Protocol) telephone, image communication by IP-FAX communication by the ITU-T recommendation T.38, or the like, are widely used. An NGN is an IP network, provided with a bandwidth guaranteeing function and a security function for the network itself, which realizes integrally a telephone service, a video communication service, a data communication service, or the like.

In addition, SIP (Session Initiation Protocol), with which a virtual session between communication devices on an NGN is established, a service being provided while the session is established, has spread and is utilized. A communication device, that established a session by SIP, performs a call or image communication using a protocol such as IP, VOIP (Voice Over IP), or the like, or various forms of services are provided, such as these being performed simultaneously.

In this kind of communication apparatus, in a case where there is an incoming call of VOIP in mid-communication by IPFAX, it is possible to detect a CNG signal by a modem, and control whether to receive by G3 FAX or whether to perform the call by telephone. On the other hand, when a G3 FAX communication with another partner is being performed when there is an incoming call of VOIP, the modem cannot be used, and the incoming call of VOIP cannot be processed.

Japanese Patent Laid-Open No. H05-145695 discloses an apparatus, in a facsimile apparatus, capable of calling in response to an incoming call on a parallel installation telephone apparatus when in an away mode. The facsimile apparatus of Japanese Patent Laid-Open No. H05-145695 detects a facsimile activation signal for activating facsimile operation from a signal on the line during detection of an off-hook of the telephone apparatus. In other words, it has a CNG signal detection unit and a silence detection unit, and in a case where a facsimile activation signal is detected by these, facsimile communication is switched to.

With a communication apparatus equipped with an IPFAX function which is an apparatus for which a plurality of sessions for communication are possible, conventionally, during usage of a modem with the G3 FAX communication in VOIP, even if there is an incoming call of VOIP with another session, determining whether that was a facsimile communication or whether it was telephone was not possible. This was due to the fact that because a detection of a CNG signal was performed by a modem, a CNG signal detection could not be made in a case where that modem was being used. In a case of an IP line because simultaneous communication of a plurality of sessions is possible, there is a need for a configuration such that, in cases where the incoming call is VOIP, it can be determined efficiently whether the incoming call is telephone or whether it is G3 FAX and a call can be made even if the modem is in use.

SUMMARY OF THE INVENTION

An aspect of the present invention is to eliminate the above-mentioned problems which are found in the conventional technology.

A feature of the present invention is to provide an arrangement in which, even if FAX communication with another partner is in progress, a new incoming call is appropriately processed.

According to an aspect of the present invention, there is provided a communication apparatus. The apparatus comprises a modem configured to perform FAX communication, a connection unit configured to connect a telephone apparatus, a detection unit configured to detect a CNG signal, and a control unit configured to control so that in a case where there is an incoming call in a state in which the FAX communication is being performed by the modem, if the CNG signal is not detected by the detection unit, a signal is supplied from a line to the telephone apparatus, and to control so that in a case where there is an incoming call in a state in which the FAX communication is not being performed by the modem, if the CNG signal is detected by the detection unit, FAX communication by the modem is initiated.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view for explaining a CNG signal.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

Figure 1:
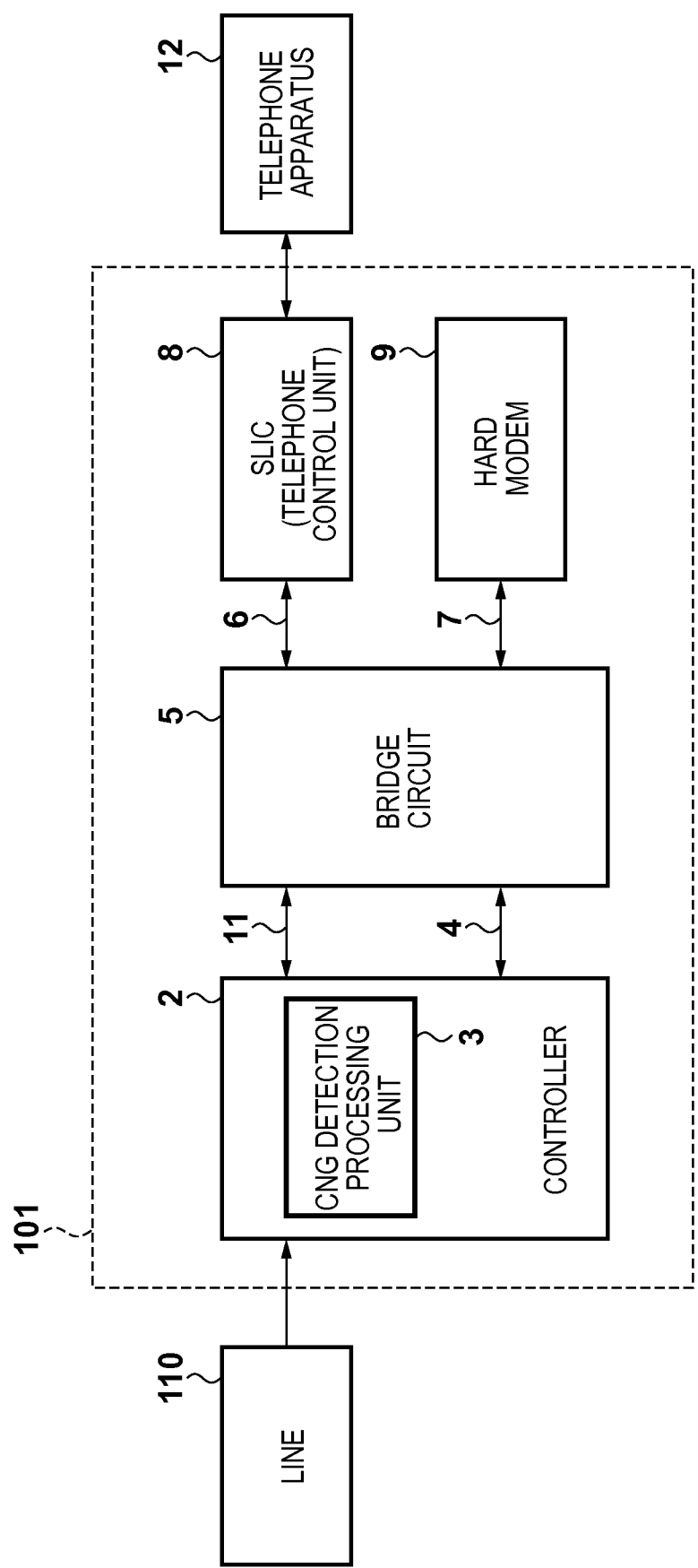
FIG. 1 is a block diagram for showing a configuration of an image communication apparatus according to embodiments of the present invention.

FIG. 1 is a block diagram for showing a configuration of an image communication apparatus 101 according to embodiments of the present invention.

The image communication apparatus 101 according to the embodiment is capable of using VOIP telephone simultaneously with IPFAX or VOIP_G3 FAX. IPFAX is FAX communication performed through an IP network conforming to the ITU-T recommendation T.38. VOIP_G3 FAX is FAX communication of transmitting and receiving, via an IP network, using VOIP technology, FAX signals transmitted and received via an analog public switched telephone network. VOIP telephone is a call mode of transmitting and receiving, via an IP network, using VOIP technology, voice (call) signals transmitted and received via an analog public switched telephone network. However, in a case where IPFAX and VOIP_G3 FAX are received simultaneously, printing is performed in the order that data is received. A controller 2 is a control unit for controlling the image communication apparatus 101 on the whole, and the controller 2 controls data transmission and receiving of the image communication apparatus 101, image scanning, printing, operation control, or the like. A line 110 is connected to a network such as an intranet or the Internet, an NGN, or the like. An SLIC (telephone control unit) 8 has a function as an interface between the line 110 and a telephone apparatus 12 for connecting the telephone apparatus, which is connected to a PBX (telephone public circuit network) and used, to the image communication apparatus 101 and using the telephone apparatus. Also, the SLIC 8 is provided with a call signal generation function, an off-hook detection function, and a CODEC function for performing A/D or D/A conversion of call transmission/call reception signals transmitted/received through the telephone apparatus 12. Note, the SLIC (telephone control unit) 8 is controlled by the controller 2.

The controller 2 and a bridge circuit 5 both have UARTs, and the controller 2 performs serial communication of data with the SLIC (telephone control electric circuit) 8 via a data line 11, the bridge circuit 5 and a data line 6. Also, the controller 2 performs serial communication with a hard modem 9 via a data line 4, the bridge circuit 5, and a data line 7. The bridge circuit 5 functions as an adjustment circuit for generating timing of serial data transmission and receiving between a UART within a P/S device 207 (FIG. 2) of the controller 2 and the SLIC 8, the hard modem 9 or the like. The hard modem 9 is a G3 modem for FAX, and is used for G3 FAX communication by VOIP. A CNG detection processing unit 3 determines that a partner is performing fax transmission when it detects a 1100 Hz signal transmitted by a transmitting side. A CNG signal is an intermittent signal, which is transmitted by a transmitting side, including a 0.5 second 1100 Hz tone signal, and a 3 second break period after that. The CNG signal will be explained later with reference to FIG. 4. Note, the CNG detection processing unit 3 is arranged on a route of communication data. In this embodiment, the CNG detection processing unit 3 is arranged within the controller 2, but it may be arranged in another place on the data line route. However, the CNG detection processing unit 3 is configured such that it is not shared with the hard modem 9.

Figure 2:
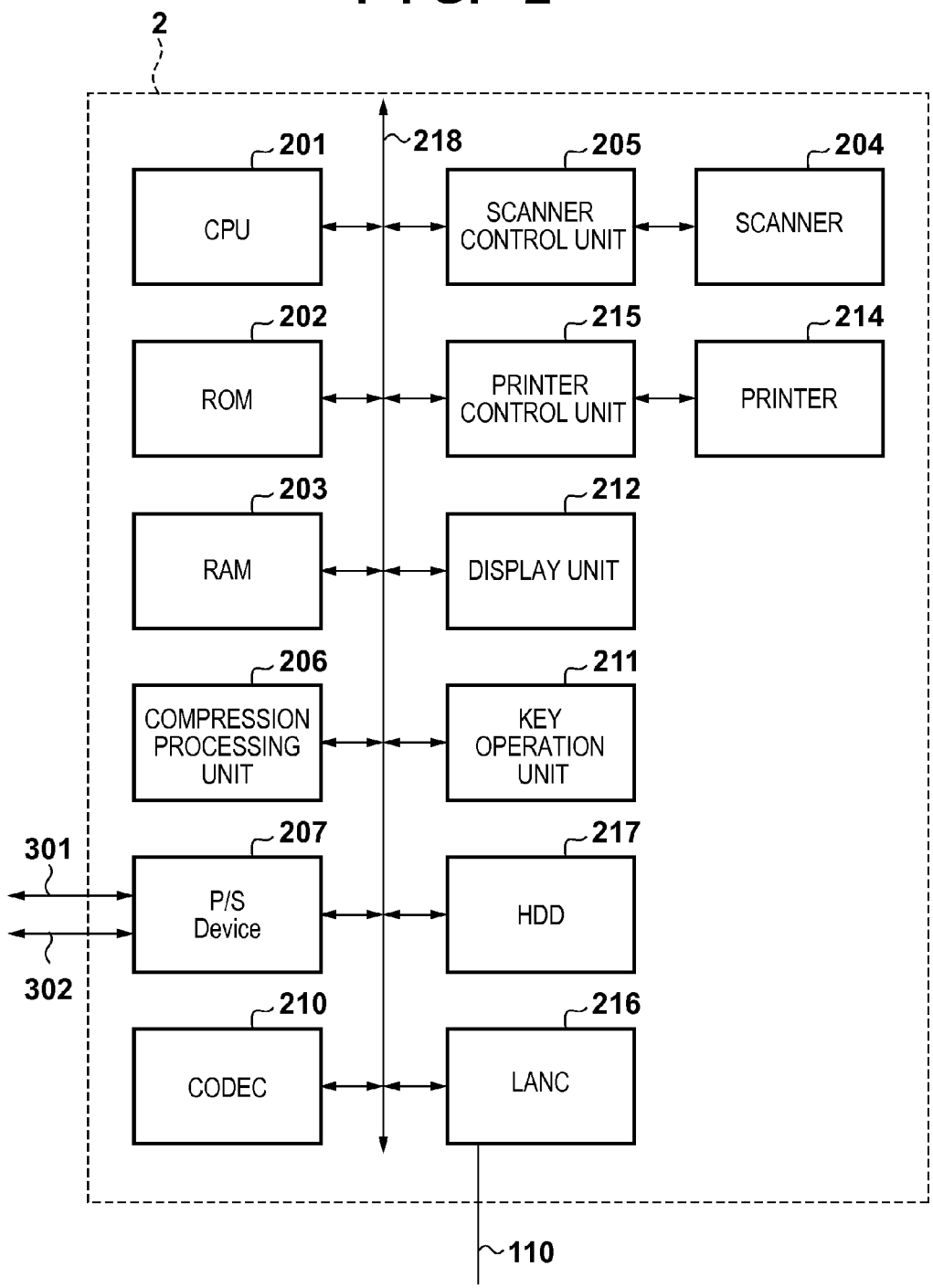
FIG. 2 is a block diagram for showing an overview of a configuration of a controller of the image communication apparatus according to embodiments.

FIG. 2 is a block diagram for showing an overview of a configuration of the controller 2 of the image communication apparatus 101 according to embodiments.

In FIG. 2, a CPU 201, as well as controlling each unit connected to the CPU 201 in accordance with a program stored in a ROM 202, controls the image communication apparatus 101 on the whole. In addition, the CPU 201 performs TCP/IP protocol processing, and assembling of image data into a TCP/IP frame is performed by control of the CPU 201. The CPU 201 also decodes image data encoded upon receipt of image data. A RAM 203, in addition to being used as a work memory upon program execution by the CPU 201, is used for buffering of transmitted and received image data. The P/S device 207 is an interface with the bridge circuit 5, and is provided with two serial communication channels (301, 302). In addition, a CODEC 210 supports a VoIP encoding/decoding mode for voice signals or facsimile signals transmitted as "treated as audio". Furthermore, it is assumed that at least an encoding/decoding mode necessary for transmitting and receiving T.38 Internet facsimile signals (in particular tone signals) is supported.

An operation unit includes a key operation unit 211 and a display unit 212, and the key operation unit 211 has a numeric keypad used mainly for dial numbers, start and stop keys, an operation button for facsimile transmission and receiving, a display device, or the like, which receives operation instructions from a user. Alternatively, the display unit 212 is used for display of various information, receiving instruction input from the user, or the like. A scanner control unit 205 controls a scanner 204 to output, to a bus 218, image data obtained by scanning an original with the scanner 204. A compression processing unit 206 is used for compressing image data obtained by scanning an original, for example. A printer control unit 215 controls a printer 214, which prints by a recording system such as an electrophotographic printing system, an ink-jet system, or the like. The printer control unit 215 converts received image data, image data input from another interface, or the like, into raster data for printing, and outputs to the printer 214. An HDD 217 is a hard disk drive which is used for storage of print data such as received image data, transmitted image data, or the like, and for storage of various data. A network I/F control unit (LANC) 216 is a LAN controller which performs data transmission and receiving through the network line 110. The CPU 201 transfers data to be transmitted to the network I/F control unit 216 LAN controller. The LANC 216 adds transmission data such as a MAC (Media Access Control) frame header, an FCS (Frame Check Sequence), or the like, and transmits to the network line 110.

The bus 218 connects the CPU 201, the RAM 203, the ROM 202, the scanner control unit 205, the compression processing unit 206, the P/S device 207, the CODEC 210, the printer control unit 215, the LANC 216, the HDD 217, or the like. Also, the bus 218 is a system bus for transmitting control signals from the CPU 201, various control unit data signals, and the like.

Figure 3:
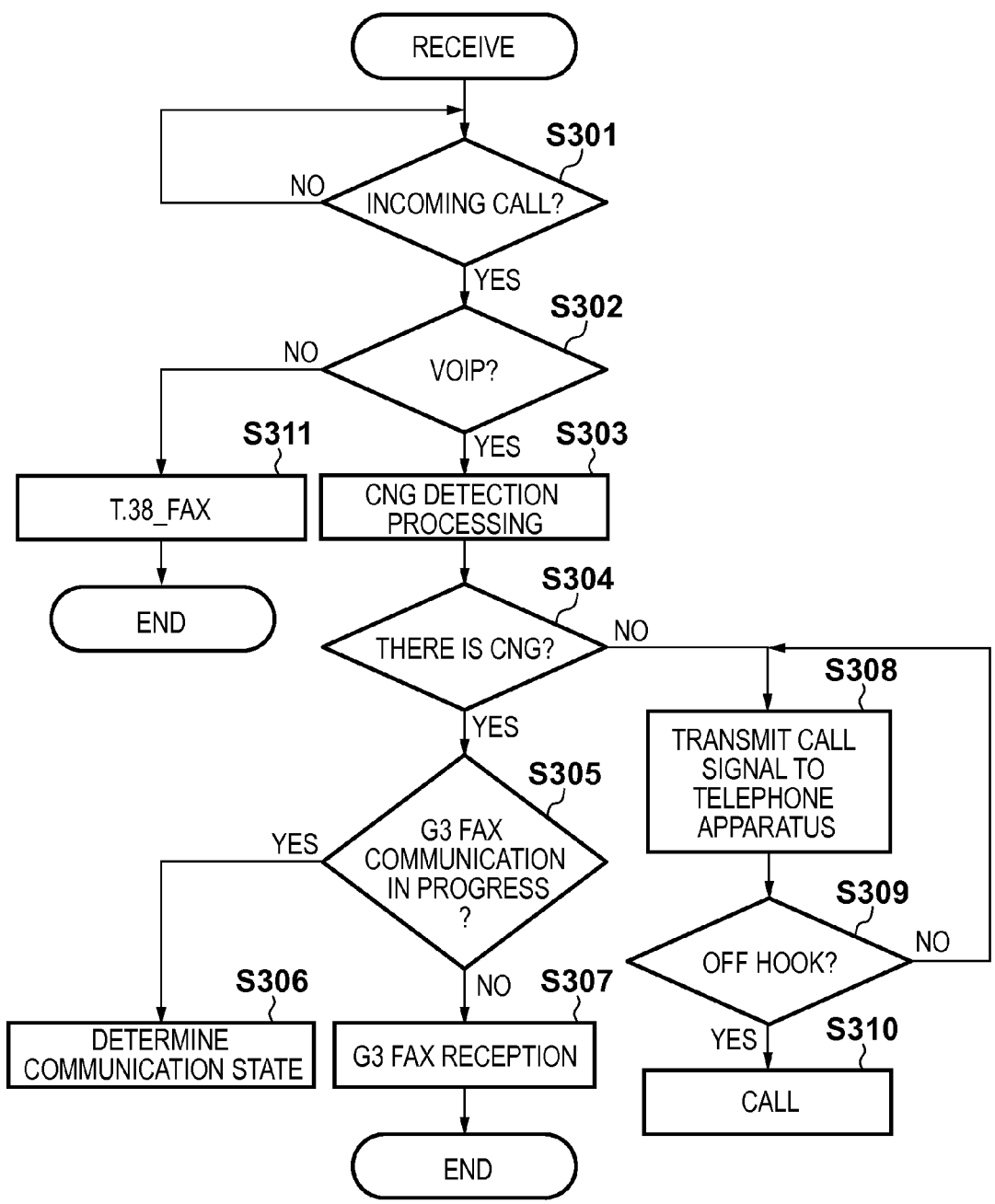
FIG. 3 is a flowchart for describing reception processing by the image communication apparatus according to embodiments of the present invention.

FIG. 3 is a flowchart for describing reception processing by the image communication apparatus 101 according to embodiments of the present invention. A program for executing the processing shown in this flowchart is stored in the ROM 202, and the processing shown by this flowchart is realized by the CPU 201 executing this program.

Firstly, in step S301, the CPU 201 determines whether or not there was an incoming call via the line 110. The detection of the incoming call is performed by detecting an incoming call command with the LANC 216. When, in step S301, it is determined that there is an incoming call, the processing proceeds to step S302, and the CPU 201 determines whether or not it is a VOIP incoming call, and because, if it is the VOIP incoming call, it is either a G3 FAX or a telephone incoming call, the processing proceeds to CNG signal detection processing of step S303 in order to determine whether it is a FAX or a telephone. On the other hand, when it is determined, in step S302, that it is not the VOIP incoming call, the processing proceeds to step S311, IPFAX communication is performed in compliance with T.38 under the control of the CPU 201.

In step S303, the CPU 201 performs a detection of a CNG signal with the CNG detection processing unit 3. The detection of the CNG signal was conventionally performed by a G3 FAX modem, but in a case of a plurality of sessions, for example when simultaneous communication of two sessions is possible, there the possibility that there will be an incoming call of VOIP even if the G3 FAX communication is in progress. For this reason, the existence or absence of a CNG signal is determined with the CNG detection processing unit 3 of the controller 2. In step S304, the processing proceeds to step S305 when the CPU 201 determines that there is a CNG signal, and the processing proceeds to step S308 when it determines that there is no CNG signal.

FIG. 4 is a view for explaining a CNG signal.

This CNG signal is an intermittent signal in which a tone signal of 1100 Hz continues for 0.5 seconds, as shown by reference numeral 400, and there is a break period of 3 seconds as shown be reference numeral 401, and next a tone signal of 1100 Hz continues for 0.5 seconds as shown by reference numeral 402. Regarding the detection of the CNG signal, in general, the CNG signal is determined to be detected upon a tone signal of the CNG signal being detected a plurality of times.

In a case where it is determined that the CNG signal is detected in step S304, the processing proceeds to step S305, and the CPU 201 determines whether or not communication by G3 FAX is in progress. In step S305, when it is determined that G3 FAX communication is in progress, the processing proceeds to step S306, and the CPU 201 determines the communication state. Here, for example, if transmission by G3 FAX is in progress, a communication time period is identified from the amount of image data to be transmitted, it is determined whether or not that communication time period is within a predetermined time period, and if within the predetermined time period, it is determined to continue transmission processing, and control is performed to connect or disconnect the line.

On the other hand, when it is determined that G3 FAX communication is not in progress in step S305, the processing proceeds to step S307, and the CPU 201, in order to receive by G3 FAX, advances to G3 FAX reception processing using the hard modem 9. Here, reception by G3 FAX becomes possible when the hard modem 9 is not in operation. Note, even if the hard modem 9 is in use at the stage where the CNG signal is detected in step S304, because approximately five seconds or more is required for detection of the CNG signal, there is the possibility that the hard modem 9 will be released before this CNG detection processing completes. Accordingly, when it is determined that G3 FAX communication is not in progress in step S305, the processing proceeds to the G3 FAX reception processing using the hard modem 9 of step S307.

On the other hand, when the CNG signal is not detected in step S304, because it is an incoming telephone call, the CPU 201 advances the processing to step S308. In step S308, the CPU 201 sounds a ring tone of the telephone apparatus 12 by generating a call signal with the SLIC 8 and outputting the call signal to the telephone apparatus 12. Then, it is determined whether or not the user of the telephone apparatus 12 did an off-hook in step S309, and when an off-hook is detected by the SLIC 8, the processing proceeds to step S310, and the line between the telephone apparatus 12 and the SLIC 8 is acquired. With this, a call by the telephone apparatus 12 becomes possible.

In this way, by virtue of the present embodiment, even if the hard modem 9 is in use in other FAX transmission, detection of a received CNG signal can be performed with the CNG detection processing unit 3 which is different to the hard modem 9. For this reason, in a case where an incoming call on an IP line is VOIP, even if the modem is in use for a facsimile transmission, it can be determined whether the incoming call is telephone or G3 FAX. Because of this, for example, currently executing communication being disconnected in order to process an incoming call of VOIP, or a transmitting side being made to wait can be reduced. Also, there is the effect that if there is an incoming telephone call, connection is possible without making the transmitting side wait.

By virtue of the present embodiment, in a case where there is an incoming call of VOIP in a second session when a hard modem is being used in a first session, for example, in an image communication apparatus having an IPFAX function, a CNG signal is detected by a CNG detection processing unit which is different to the hard modem. With this, because the CNG signal can be detected even without using the hard modem, which is in communication by the first session, it can be determined whether the incoming call is FAX or telephone efficiently. If there is an incoming telephone call, calling can be performed immediately. On the other hand, there is the advantage that in a case of a facsimile reception, if the hard modem is released during the detecting of the CNG signal, even if the hard modem is in use, fax reception can be performed without making the partner wait because the facsimile signal can be received without disconnecting the communication.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127984, filed Jun. 18, 2013, which is hereby incorporated by reference herein in its entirety.

What is claimed is:

1. A communication apparatus, comprising:
a modem configured to perform FAX communication;
a connection unit configured to connect a telephone apparatus;
a detection unit configured to detect a CNG signal after there is an incoming call, wherein the detection unit is not included in the modem, and the detection unit is able to detect, while the modem is performing the FAX communication, the CNG signal without stopping the FAX communication; and
a control unit configured to control, if the CNG signal is not detected by the detection unit while the modem is performing the FAX communication, so that a call signal is supplied to the telephone apparatus, and to control, if the CNG signal is detected by the detection unit while the modem is performing the FAX communication, so that a next FAX communication based on the CNG signal is performed by the modem after completion of the FAX communication being performed by the modem.

2. The communication apparatus according to claim 1, wherein the detection unit is arranged closer to a side of a telephone line than the modem.

3. The communication apparatus according to claim 1, wherein the control unit controls so that if the CNG signal is not detected by the detection unit after there is the incoming call while the modem is not performing the FAX communication, the call signal is supplied to the telephone apparatus.

4. The communication apparatus according to claim 1, wherein the control unit, if the CNG signal is detected by the detection unit after there is the incoming call while the modem is performing the FAX communication, controls so that the incoming call is disconnected.

5. The communication apparatus according to claim 1, further comprising a determination unit configured to determine whether or not to disconnect, after there is the incoming call while while the modem is performing the FAX communication, the incoming call if the CNG signal is detected by the detection unit.

6. The communication apparatus according to claim 5, wherein the determination unit determines based on a communication time period of the FAX communication being performed by the modem.

7. The communication apparatus according to claim 1, wherein the incoming call is an incoming call of VoIP.

8. A method of controlling a communication apparatus having a modem configured to performed FAX communication, and a connection unit configured to connect a telephone apparatus, the method comprising:
  detecting, by a detection unit, a CNG signal after there is an incoming call, wherein the detection unit is not included in the modem, and the detection unit is able to detect, while the modem is performing the FAX communication, the CNG signal without stopping the FAX communication; and
  controlling, if the CNG signal is not detected in the detecting while the modem is performing the FAX communication, so that a call signal is supplied to the telephone apparatus, and controlling, if the CNG signal is detected by the detection unit while the modem is performing the FAX communication, so that a next FAX communication based on the incoming call is performed by the modem after completion of the FAX communication being performed by the modem.

9. A non-transitory computer-readable storage medium storing a program for causing a computer to perform a method of controlling a communication apparatus having a modem configured to performed FAX communication, and a connection unit configured to connect a telephone apparatus, the method comprising:
  detecting, by a detection unit, a CNG signal after there is an incoming call, wherein the detection unit is not included in the modem, and the detection unit is able to detect, while the modem is performing the FAX communication, the CNG signal without stopping the FAX communication; and
  controlling, if the CNG signal is not detected in the detecting while the modem is performing the FAX communication, so that a call signal is supplied to the telephone apparatus, and controlling, if the CNG signal is detected by the detection unit while the modem is performing the FAX communication, so that a next FAX communication based on the incoming call is performed by the modem after completion of the FAX communication being performed by the modem.

* * * * *